June 2, 1925. 1,539,951
J. M. PEERSON
CLEANER FOR COTTON FEEDERS
Filed Aug. 7, 1922
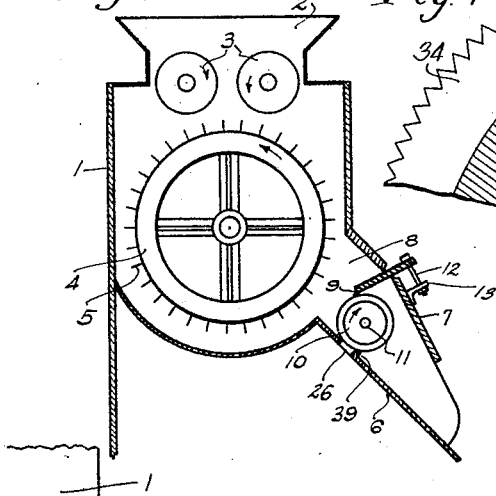

Patented June 2, 1925.

1,539,951

UNITED STATES PATENT OFFICE.

JAMES M. PEERSON, OF FLORENCE, ALABAMA.

CLEANER FOR COTTON FEEDERS.

Application filed August 7, 1922. Serial No. 580,364.

*To all whom it may concern:*

Be it known that I, JAMES M. PEERSON, a citizen of the United States of America, residing at Florence, in the county of Lauderdale and State of Alabama, have invented certain new and useful Improvements in Cleaners for Cotton Feeders, of which the following is a specification.

My invention relates to an appliance or attachment for various types of cotton feeders, and its object is to more effectively clean cotton of nails, sticks, rocks, hulls and all other foreign matter before the same is fed to the gin.

My invention contemplates the combination with the feeder drum of any suitable type of a picker roller which in co-operation with a suitable huller bar is disposed to receive the cotton and foreign matter as the same is thrown from the feeder drum into the picker box.

A further object is to provide a type of picker roller especially adapted to most effectively clean the cotton, as thus delivered to it from the feeder drum, and to this end I have designed a picker roller having incorporated therewith right and left hand helical flights which are adapted to both positively force and by an induced draft to blow the foreign matter in the cotton axially of the picker roller from the center thereof towards both ends of the picker box.

A further distinctive feature of my invention is the elongation of the picker roller so that its ends project sufficiently beyond the line of feed of the cotton from the feeder drum at both ends to enable the roller to effectively pick the cotton, notwithstanding the endwise movement thereof produced by the flights.

A further distinctive feature is the provision in the ends of the picker box of adjustable gates or doors arranged to control the axial discharge of foreign matter that has failed to pass through the normal discharge opening therefor in the picker board.

A further distinctive feature of my invention is the provision of the helical flights with a roughened or serrated outer edge which will facilitate picking up the cotton with the spikes, pulling it under the huller board shown as viewed in side elevation looking to the right in Fig. 4.

A further distinctive feature of my invention is the designing of the picker box above the picker roller so that the heavier particles of the matter discharged from the feeder drum are projected into the picker box above the huller bar down which they slide and fall onto the picker board, gravitating down same against and under the picker roller.

A further distinctive feature of my invention relates to the adjustable bearings provided for the picker roller, these bearings being adjustably connected to a board which remains fixed, the connections permitting the ready adjustment of the picker roller to allow such foreign matter to pass under the picker roller without leaving space enough for cotton to pass.

My invention also comprises the novel details of construction and arrangements of parts, which in their preferred embodiment only are illustrated in the accompanying drawings, in which:—

Fig. 1 is a vertical transverse sectional view through a conventional feeder equipped with my cleaning attachments.

Fig. 2 is a front elevation of a part of the cleaner, broken away to show the middle portion of the picker roller.

Fig. 3 is an enlarged detail cross-sectional view through the cleaner attachments proper taken on the line 3—3 of Fig. 2.

Fig. 4 is an enlarged detail view of part of a part of the picker roller and huller bar shown as projected from their operating positions in Fig. 3.

Figs 5 and 6 are detail views in end and partial front elevation of a modified type of huller.

Fig. 7 is a fragmental detail view of a flight with its serrated edge.

Similar reference numerals refer to similar parts throughout the drawings.

In the embodiment of my invention illustrated, I show a feeder comprising a casing 1 having a top hopper 2 and feeder rollers 3 which deliver the seed cotton to the feeder drum 4 which is equipped with the usual picker teeth 5, and which in ordinary practice delivers the cotton to a chute down which it falls into the gin breast. In my present arrangement I substitute for the chute a picker board 6 above which I arrange a picker box comprising a top wall 7 formed with an angle to provide a pocket 8 above the huller board 9 and the picker roller 10, which latter is journaled upon a shaft 11 which is mounted in the manner hereinafter described.

The picker board 6 corresponds at its lower side in width with the feeder casing 1 but it flares outwardly at 15 at each end so as to underlie the ends of the picker roller 10 which, as seen in Fig. 2, project substantially on each side beyond the line of feed of cotton from the feeder. The picker board is provided at each end with an end wall 16 through which the shaft of the picker roller projects and which is high enough above the picker roller to form the ends of the picker box. These walls come closer together below the picker roller to provide a funnel-like chute which will contact the clean cotton sliding down the picker board to a width that will conform substantially with the width of the gin breast. The picker board ends 15 are provided beyond the walls 16 with further extensions 17, each carrying, as seen in Fig. 3, a screw standard 18 upon which is mounted an end bearing 19 for the picker roller shaft 11. Each standard has its lower end threaded to receive nuts 20 and 21 disposed above and below the board 17 and thus afford an adjustable and locked support or bearing 19 for the picker roller 10.

The huller bar 9 projects into the picker box through a slot 22 extending across the top 7 from side to side. The huller bar likewise extends entirely across the picker box and has end extensions 23 which overhang and rest in the top edge of the end walls 16. The under edge of the slot 22 is bevelled so that the huller bar can rock thereon in being adjusted to present its lower bevelled edge 25 in proper relation to the picker roller to permit only the cotton to be pulled under it while allowing the heavier matter to be thrown on top of it and then to slide back down against the picker roller. In the picker board 6 below the picker roller I provide a slot 26 through which such small foreign matter can pass, as can slide down the board and pass under the roller without carrying cotton. The larger foreign matter is carried to the ends of the picker roller and escapes through the openings 27 in the end walls 16 of the picker box. Within the box at each end I provide a vertical partition 28 triangular in shape (see dotted lines in Fig. 3), and to its edge adjacent to the roller I connect by hinges 29 a swinging door or board 30 which is held in adjusted position by a pin 31 in one of a series of holes 32 in the top 7.

The picker roller proper is provided with flights suitable to induce an endwise or axial movement of the matter that comes in contact therewith and especially of the foreign matter. The heavier foreign matter is more positively acted upon by the picker roller flight to force it toward the end openings 27, while the lighter particles of dust and trash are moved endwise by the draft induced by the flight. In its preferred form I utilize, in addition to the usual spikes 33, right and left hand flights 34 diverging from the center of the roller towards each end and following a helical path and terminating at the ends of the picker roller. Preferably the outer edge of the flights are serrated or roughened to increase engagement with the cotton, facilitating separation of foreign matter, forcing it against the bar to be discharged into the gin breast, and the particles which have been engaged by the huller bar are diverted and again fall on the picker board.

If desired, instead of the huller bar I may utilize the huller device shown in Figs. 5 and 6, wherein the huller board 9 is raised and carries on its lower side a series of hanger bearings 35 in which is mounted a shaft 36 having spacer sleeves 37 thereon between which I mount corrugated disks 38 in close association and disposed to co-act with the picker roller, as shown in Fig. 5, and driven in the opposite direction from the picker roller. This forms a type of huller suited to certain classes of work.

The operation of my device may be briefly described as follows. The seed cotton with foreign matter therein as discharged from the rapidly rotating feeder drum 4 is delivered into the picker box, the heavier particles being for the most part thrown into the pocket 8 above the huller board 9 while the lighter matters are discharged directly to the picker roller. The direction of rotation of the picker roller with relation to the feeder drum is indicated by the arrows in Fig. 1, and is such as to effectively pick and deliver the cleaned cotton past the huller bar 9 and deliver it to the picker board 6 down which it passes between the converging chute sides 16 to the gin breast. The heavier matter accumulating in the pocket 8 will roll as it slides down the inclined wall 9 and there is joined with it such foreign matter as is thrown up by the roller and not carried under the huller board. This heavier matter all tends to fall onto the picker board 6 in position, if small enough, to work through the discharge slot 26 in the picker board. The matter not thus escaping, and which is of such character as not to pass the huller board, will be fed or blown endwise of the picker roller by the action of the flights 34 thereon until it reaches the end zones of the picker roller beyond the feed of the cotton. Here, such as does not finally escape through the slot 26 is discharged through the openings 27 in the end walls 16 of the picker board and the rapidity of escaping is under control of the hinged doors 30 which control the speed of discharge of all such heavier matter so as to insure thorough picking.

The corrugated disk huller rollers rotate reversely to the picker roller and will effectively clean the cotton as the disks and their corrugations engage the foreign matter and throw it away from the picker roller, causing it to fall on the picker board 6 and to be discharged either through slot 26 or openings 27.

In Fig. 5 I show more clearly the relation of the picker roller to the picker board 6 and its slot 26. It will be noted that I provide along the lower edge of the slot a cleat 39 having its upper face concave to conform to the curvature of the picker roller, said cleat presenting a sharp edge 40 which will tend to prevent any cotton being drawn past it by the roller spikes or flights. The other edge 41 is shown raised sufficiently above the opposite side of the slot 26 so that such cotton as is drawn over the cleat will tend to fall onto the board 6 and be again carried over by the roller. This leaves ample clearance under the roller for foreign matter to pass down to and escape through the slot 26.

The huller board 9 is adjusted relatively to the picker roller by a bolt 12 which is passed through a bracket 13, fast on the box top 7, and there engaged by a nut 14, by means of which the huller board can be rocked on the bevel edge of the slot 22 and held in the desired operating position.

Though I have described with great particularity the details of the embodiment of the invention herein shown, it is not to be construed that I am limited thereto as changes in arrangement and substitution of equivalents may be made by those skilled in the art without departing from the invention as defined in the appended claims.

Having thus described my invention, what I claim as new and desire to secure by Letters Patent, is:—

1. In a feeder for cotton gins, the combination with a feeder drum, of co-acting picking and hulling elements, comprising a picker roller and an inclined huller board above the roller, and a picker board under said elements having separate discharges for the cotton and foreign matter.

2. In a cotton feeder, the combination with a feeder drum, of a picker box into which the drum feeds the cotton and foreign matter, said box having a bottom discharge for the foreign matter and a chute for the discharge of cotton into the gin breast, and co-acting picking and hulling elements adapted to separate the foreign matter from the cotton and deliver each to its appropriate discharge, and comprising a picker roller over the bottom discharge and a huller board over the roller and inclined to discharge matter collecting thereon onto the picker board above said discharge.

3. In a cotton feeder, a feeder drum, a picker box into which the drum feeds, and a picker roller in said box which is longer than the feeder drum, hulling elements co-operating with the picker roller, and separate discharges for the foreign matter and cleaned cotton, substantially as described.

4. The combination with a feeder having a feeder drum, of a picker box substantially wider than the feeder, a picker roller in said box also longer than the drum and projecting at each end beyond the same, a picker board with a discharge for the cleaned cotton into the gin breast, said board having a foreign matter discharge opening below the picker roller, and right and left hand flights on the picker roller to induce an endwise movement of the matter contacting therewith.

5. The combination with a cotton feeder having a feeder drum, of a picker box having a chamber in its upper portion into which the heavier particles are projected by the feeder drum, a sloping bottom wall for said chamber, hulling means carried by the lower edge of said sloping wall, a picker roller co-acting with the hulling means, a picker board having a discharge opening for the foreign matter below the picker roller, and means comprising helical flights on the picker roller for producing an axial movement of the heavier matter engaging the roller, substantially as described.

6. In a cotton feeder, a cleaning attachment comprising a picker roller, a picker board adapted to discharge the picked cotton to the gin breast and having an aperture for the discharge of the foreign matter removed from the cotton, a bearing for the picker roller, and a standard for the bearing adjustably mounted relatively to the picker board, substantially as described.

7. In a cotton feeder, a cleaning attachment comprising a picker roller, a picker board adapted to discharge the picked cotton to the gin breast and having an aperture for the discharge of the foreign matter removed from the cotton, a bearing for the picker roller, a standard for the bearing adjustably mounted on the picker board, a huller element co-acting with the picker roller, and means to mount on the attachment means for adjustably supporting the huller element relatively to the picker roller.

8. The combination with a cotton feeder having a feeder drum, of a picker box into which the feeder drum discharges, a picker board forming the bottom of said box and having end walls which flare outwardly to a width greater than the feeder, and a picker roller longer than the feeder roller disposed in said picker box and adjustably mounted relatively to said picker board, said roller having a shaft which projects through the end walls on the picker board and has a driving element thereon, and openings for the endwise discharge of foreign matter through said end walls.

9. The combination with a cotton feeder having a feeding drum, of a picker box into which the drum discharges, a picker board forming the bottom of said box and having end walls which flare outwardly to a width greater than the feeder, and a picker roller longer than the feeder drum disposed in said picker box and adjustably mounted relatively to said picker board, said roller having a shaft projecting through the end walls on the picker board with a driving element thereon, openings in said end walls for the endwise discharge of foreign matter, and adjustable means to control the rate of outflow through said openings.

10. A picker roller for a cotton cleaner comprising picker teeth and a helical flight having a serrated outer edge.

11. A picker roller for a cotton cleaner comprising picker teeth and a helical flight, said flight comprising right and left helices leading from the center towards each end.

12. A picker roller for a cotton cleaner comprising picker teeth and a helical flight, said flight comprising right and left helices leading from the center towards each end and having its outer edges serrated.

13. The combination with a cotton feeder, of a cleaning attachment comprising a picker box, huller elements, and a picker roller coacting with the latter and comprising picker teeth and right and left hand helical flights, and a picker board forming a chute for the picked cotton, said picker box having a bottom aperture below the picker roller and end apertures at each end of the picker roller for the discharge of foreign matter.

14. The combination with a cotton feeder, of a cleaning attachment comprising a picker box, hulling elements, and a picker roller co-acting with the latter and comprising picker teeth and right and left hand helical flights, a picker board forming a chute for the picked cotton and having an intermediate aperture below the picker roller for the discharge of foreign matter, said board having end walls, and openings therein for the endwise discharge of foreign matter, and a huller bar co-acting with said picker roller.

15. In a cotton cleaner, a picker roller, a straight edge huller board disposed to co-act with the roller, and separate discharges for the cotton and foreign matter, the foreign matter discharges being below and at the ends of the roller, and means on the roller to feed the foreign matter towards said end discharges.

16. In a cotton cleaner, a picker board, a picker roller, a straight edge huller board co-acting with the roller and inclined so as to cause matter falling on top of same to slide down on the picker board in front of the picker roller, and separate discharges for the foreign matter and cotton.

17. A cotton cleaner as in claim 16, in which the huller board has its working edge bevelled and disposed substantially tangentially so as to overhang the picker roller.

18. In a cotton cleaner, a picker roller, a picker board having a narrow slot extending lengthwise under the roller, and a cleat on the board adapted to strip off cotton which the roller tends to carry back under it.

19. A cotton cleaner in accordance with claim 18, in which the cleat edge adjacent to the slot is raised substantially above the remote edge of the slot, as and for the purposes described.

In testimony whereof I affix my signature.

JAMES M. PEERSON.

Witness:
NOMIE WELSH.